United States Patent [19]
Sharp et al.

[11] Patent Number: 5,209,258
[45] Date of Patent: May 11, 1993

[54] APPARATUS AND METHOD FOR MINIMIZING PULSATION-INDUCED ERRORS IN DIFFERENTIAL PRESSURE FLOW MEASURING DEVICES

[75] Inventors: James M. Sharp, Hitchcock; William R. Freund, Houston, both of Tex.

[73] Assignee: Daniel Flow Products, Houston, Tex.

[21] Appl. No.: 837,661

[22] Filed: Feb. 14, 1992

Related U.S. Application Data

[63] Continuation of Ser. No. 494,871, Mar. 7, 1990, abandoned, which is a continuation of Ser. No. 181,918, Apr. 15, 1988, abandoned, which is a continuation-in-part of Ser. No. 20,562, Mar. 2, 1987.

[51] Int. Cl.$^5$ ............................................. F16L 3/00
[52] U.S. Cl. .................................... 137/343; 137/557; 137/597; 73/756; 73/861.47
[58] Field of Search ............... 137/343, 595, 597, 557, 137/876, 887; 73/707, 756, 861.47, 861.61, 861.62

[56] References Cited

U.S. PATENT DOCUMENTS

| | | | |
|---|---|---|---|
| 2,132,338 | 10/1938 | Ziebolz | 73/861.47 X |
| 2,252,337 | 8/1941 | Worthen | 73/861.61 X |
| 2,306,940 | 12/1942 | Fischer | 73/861.61 |
| 3,450,157 | 6/1969 | Hewson | 137/595 |
| 3,596,680 | 8/1971 | Adams | 137/597 |
| 4,193,420 | 3/1980 | Hewson | 137/597 |
| 4,337,668 | 7/1982 | Zupanick | 73/861.61 |
| 4,466,290 | 8/1984 | Frick | 73/756 |
| 4,738,276 | 4/1988 | Adams | 137/343 |

*Primary Examiner*—A. Michael Chambers
*Attorney, Agent, or Firm*—Alton W. Payne

[57] ABSTRACT

An apparatus and method for reducing pulsation-induced errors in the secondary system of orifice meters or other differential pressure flow measuring devices. The apparatus of the present invention comprising means for reducing the distance between the flow meter and the differential pressure detector for reducing pulsation-induced errors as well as reducing errors caused by rectification and energy redistribution, and means for maintaining a constant cross section between the orifice meter or the like and the differential pressure detector for reducing the pulsation-induced errors and, particularly for reducing errors caused by rectification and energy redistribution. The method of the present invention comprises adapting the orifice meter or the like for having apertures therein with constant cross sections corresponding to the channels of a manifold and respective cannular members, aligning the apertures and channels in registry for achieving a constant cross section therethrough, and engaging, operationally, the orifice meter, manifold and cannular members for providing a contiguous, close relationship with a constant cross section between the meter and a differential pressure detector.

7 Claims, 10 Drawing Sheets

APPARATUS AND METHOD FOR MINIMIZING PULSATION-INDUCED ERRORS IN DIFFERENTIAL PRESSURE FLOW MEASURING DEVICES

CROSS REFERENCE TO RELATED APPLICATION

The present application is a continuation application of the application of William R. Freund, Jr. and James M. Sharp, U.S. Ser. No. 494,871, filed Mar. 7, 1990, entitled "Apparatus and Method for Minimizing Pulsation-Induced Errors in Differential Pressure Flow Measuring Devices," now abandoned; which application is a continuation of the application of William R. Freund, Jr. and James M. Sharp, U.S. Ser. No. 181,918, filed Apr. 15, 1988, entitled "Apparatus and Method for Minimizing Pulsation-Induced Errors in Differential Pressure Flow Measuring Devices," now abandoned; which application is a continuation-in-part application of the application of James M. Sharp, David Stavish and William R. Freund, Jr., U.S. Ser. No. 020,562, filed Mar. 2, 1987, entitled "Multi-Valve Manifold for Minimizing Pulsation-Induced Errors in Orifice and Other Differential Pressure Flow Measuring Devices."

FIELD OF THE INVENTION

The present invention relates generally to minimizing pulsation-induced errors in differential pressure flow measuring devices. The apparatus of the present invention relates to a multi-valve manifold and an insert for minimizing pulsation-induced errors in conjunction with orifice meters and other differential pressure sensing meters for the measurement of fluid flow. Specifically, the present invention relates to minimizing pulsation-induced errors in the secondary elements of differential pressure flow measuring devices. Further, the present invention relates to a method of retrofitting existing differential pressure flow measuring devices for minimizing pulsation-induced errors in the measurement of fluid flow. The present invention can be incorporated into the design of new differential pressure flow measuring devices, or, can be used to retrofit existing differential pressure flow measuring devices.

BACKGROUND OF THE INVENTION

Pulsation-induced errors in orifice meters and other differential pressure flow measuring devices have plagued measurement personnel for decades. The quantitative determination of pulsation-induced errors on a sound, and generally acceptable, basis has been extremely difficult, if not altogether infeasible. Thus, pulsation-induced errors have led to many problems. These problems are critical when, for example, the custody transfer of materials is involved. Custody transfer problems are critical when two meters in series do not agree and the quantities or unit costs of the material being transferred represents a large amount of money. In the natural gas industry, as well as other industries which require the control of fluids, orifice meters are the flow measurement standard. Hence, the achievement of acceptable measurement accuracy is a basic requirement since not only is the value of the transferred fluid a consideration but, also, such meters represent both a large investment and establish the basis and procedures upon which custody transfer and system balances depend.

Numerous theories and explanations have been advanced upon which pulsation-induced errors can be argued and remedies postulated. For example, valid explanations have been presented to explain the "square root error," lead line distributed resonances, lumped-element resonances, signal rectification, phase differences, energy redistribution, and various methods of correcting chart integration and/or electronic flow computation. Many of these are valid and useful in dealing with specific components of the measurement system or process. No generalized explanation of pulsation-induced error, using any one or more of these accepted explanations, has resulted either in the quantitative explanation of the totality of phenomena for the entire measurement system or in a means for the quantitative determination of total system pulsation-induced error.

To further complicate matters, the frequency spectrum and amplitude of pulsations at any point in the measurement system are functions of compressor speed, fluid temperature and other operating and ambient variables. Consequently, any measurements or error diagnoses made are condition-specific. Projections of pulsation conditions and induced errors for the entire range of anticipated operating and ambient conditions, therefore, would require a large number of expensive measurements which are difficult to interpret. It is pertinent to note that the establishment of coefficients for orifice meters, for steady flow conditions only, has been under way for decades and is still being investigated for situations where greater flow measurement accuracy and validity are being sought. In particular, such validity and accuracy are being sought for wider ranges of gas properties and operating conditions.

The most widely accepted means for reducing pulsation-induced errors in orifice meters has been that of isolating the meter from pulsations by the insertion of acoustic filters (pulsation dampeners) or by remote location of the meter station from compressors and other sources of pulsation. However, isolation is a predictable and effective solution only insofar as the primary element of the meter is concerned. Pulsations do not "die out" or damped quickly in a transmission line for fluids of low viscosity and, therefore, pulsations travel long distances. Thus, isolating the meter from pulsations by placing the meter in a remote location is not only expensive and inconvenient but, also, may prove ineffective in some instances. Similarly, for specific situations, isolating the meter from pulsations by the insertion of acoustic filters can be effective. However, in high pressure large diameter transmission lines, the installation of acoustic filters is expensive either in terms of the capital investment or in terms of operating cost due to the introduction of a pressure drop. Further, "isolation" is not necessarily possible since pulsations are generated by the flow itself when passing junctions or constrictions such as valves. In most cases, some level of pulsation is present to excite resonances in both the primary and secondary elements of the meter system which can then result in significant meter error. A gas-filled pipe is a finely tuned resonator with little internal damping. Thus, little energy is required to excite a gas-filled pipe into high amplitude resonance. The amplitude of resonance is obviously greater when the frequencies of the exciting pulsation and the resonator closely coincide. Further, the exciting pulsation usually includes many harmonics of the basic frequency, such that coincidence is often realized.

In general, a differential pressure flow measuring device consists of (1) a primary element, such as an orifice plate or pitot tube, that creates a differential pressure that is proportional to flow rate in a known and repeatable way, and (2) a secondary system which includes a conduit for the transmission of the differential pressure so generated from the primary element to a transducer, the transducer and a recorder or flow computer. When the differential pressure includes a pulsating (dynamic) component, each of these elements of components can produce an error or change an error in the measurement of flow rate and total flow.

Any effective discussion of pulsation-induced errors requires reference to a specific meter type. Because of the long time prevalence of orifice meters in the natural gas production and transmission industries and many process industries, the orifice is used as the basis for the following discussions. Analogous descriptions and discussions would apply to other differential pressure sensing devices, including flow meters. For orifice meters, it should be noted that the orifice plate may be held between flanges, or in a fitting, or the like so long as dimensions, alignment, concentricity, tap hole sizes and locations, and other prerequisites are in accordance with specified standards (e.g., AGA3—1985). In the present discussions, the terms flange and fitting shall be used interchangeably depending on the specific discussions. Similarly, the terms differential pressure sensing device, orifice meter or flow meter shall be used interchangeably depending on the specific discussion.

The primary element in an orifice meter includes circular, concentric, smooth tubing of prescribed length upstream and downstream of an orifice plate and the associated flanges or fittings required for meter installation or for the orifice plate replacement or inspection. Generally, the primary element of an orifice meter is very insensitive to pulsation. For example, a severe pulsation of forty percent (40%) pressure amplitude is required to produce a "square root error" of one percent (1%), and a pressure amplitude of thirty percent (30%) is required to produce a "square root error" of one-half percent (0.5%). The "square root error" in the primary element is a predictable and calculable value that is based on the dependence of differential pressure on the square of the velocity in the primary element. The "square root error" can be computed by:

$$SRE_f = \frac{\sqrt{avg \Delta P(t)} - avg \sqrt{\Delta P(t)}}{avg \sqrt{\Delta P(t)}}$$

where:
$SRE_f$ is the fractional square root error in flow,
$\Delta P(t)$ is the time varying differential pressure.

The square root error can be measured accurately in the field with suitable instrumentation. However, the square root error measurement is quantitatively meaningful for the primary element only (i.e., when made directly at the tap holes in the orifice flange or fitting). While a "square root error" can be measured at points in the secondary system, it is not quantitatively meaningful since there is no net flow in the secondary system and, thus, the appropriate relationship does not exist. Nonetheless, such measurement in the secondary system are useful in determining both the presence of significant square root error in the total measurement system and in diagnosing the cause for any change in the square root error between the primary element and the transducer.

In addition to the square root error, the primary element is theoretically subject to an "inertial error." An inertial error measurement evinces changes in the orifice coefficient used to calculate flow from differential pressure that results from pulsation. However, experiment shows that such errors are insignificant when the square root error in the primary element is one percent (1%) or less, and, the pulsation frequencies in the primary element are less than 100 Hz. These conditions are seldom exceeded in the field and, in any event, corrective action would be dictated by the magnitude of the square root error regardless of any shift in orifice coefficient. Hence, the inertial error appears to be of no practical consequence.

In the secondary system, the means for transmitting the differential pressure generated in the primary element to a transducer is normally an acoustic transmission line. Generally, an acoustic transmission line comprises lead lines, valves, manifold and the like. Hence, any acoustic mismatches or resonances in the transmission line can result in the distortion or amplification of the dynamic component of the differential pressure, and can result in a shift in the average value of the static differential pressure from that corresponding to a steady flow without pulsation. One objective of the present invention is the design of the transmission line so that the differential pressure generated by flow in the primary element is transmitted from that element to a transducer without distortion, amplification or shift in average value. It is the transmission line portion of the secondary system with which the present invention is concerned. However, the interaction of the transmission line portion of the secondary system with the primary element and with the other parts of the secondary system must be an integral part of the design of any metering system.

The transducer can also contribute to a pulsation-induced error in flow measurement using differential pressure devices. For example, the frequency response of the transducer can be, and frequently is, very low. Thus, most of the dynamic component of differential pressure cannot be sensed by the transducer. This can be a desired effect provided the transmission line and transducer characteristics are designed for a common objective (for example, if the transmission line does not change the average differential pressure) and this is, also, compatible with the recorder or computer characteristics. It this common objective is not realized, however, this effect is generally detrimental to maximum measurement accuracy. Also, the transducer may participate in a mechanical/acoustical resonance with the transmission line, particularly if its mechanical resonant frequency coincides with that of the pulsation present in the primary system or with resonant frequencies in any part of the acoustic transmission line. The latter can be a major contributor to measurement error.

A mechanical recorder can enter into a common mode resonance with the acoustic transmission line as in the case of the transducer. However, the mechanical recorder entering into a common mode resonance with the acoustic transmission line is rare unless the transducer is a direct drive for the recorder pen. An electronic flow computer, however, is free of any acoustical/mechanical type of error generation. Nonetheless, most electronic flow computers sample the differential pressure on a periodic basis (e.g., once per second) and calculate flow from the sampled value of differential pressure. Hence, the presence of either a dynamic component in the transducer output (corresponding to the pulsation in the primary element, or to resonance, distortion or amplification in the secondary system) or an average value shift caused by the transmission line can result in errors in the computation of flow rate and total flow.

The secondary system of the orifice meter is the predominant source of significant pulsation-induced errors. The secondary system can increase the pulsation-induced error extant at the output from the primary element by one or two orders of magnitude. Within the secondary system, the acoustic transmission line is the major factor to be considered. However, as stated, the interaction of the acoustic transmission line with the transducer and the recorder/computer should not be ignored when large pulsations exist within the secondary system.

No net flow exists in the acoustic transmission system, i.e., beyond the tap holes in the orifice flange or fitting. Pulsations are acoustic waves which ingress and egress the transmission system at the velocity of sound. The pressure and velocity of these acoustic waves are not in phase in any resonant section in the transmission system. Thus, acoustical impedance is a dominant factor in controlling the transmission of pulsations from the orifice fitting to the transducer. Generally, acoustical impedance and changes in acoustical impedance in the lead lines, valves, manifold and other components comprising the transmission system can cause pulsation-induced errors. More particularly, the acoustical properties of the system can amplify and distort even minor pulsation at the system input such that the pulsation is significant upon arrival of the signal at the transducer. Also, changes in acoustical impedance produce shifts in the average differential pressure prior to arrival at the transducer.

Acoustical impedance changes, or "mismatches," occur in both the upstream and downstream lead lines in the secondary system of an orifice meter. At any such mismatch, there is a partial reflection of energy in the dynamic component of the differential pressure signal. The positive or negative half of a sinusoidal pressure wave is preferentially transmitted versus the other half depending on whether there is an increase or decrease in impedance. The result is partial rectification of the wave with a commensurate shift in the average value of differential pressure. Also, even without impedance changes, a redistribution of energy between kinetic and potential energy is undertaken as the wave progresses through a transmission system. The redistribution of energy also results in a shift in the average differential pressure. Since most in place systems use a low frequency transducer and a flow computation based on the square root of the average differential pressure, either effect introduces an error in measurement which is an entirely valid error. These effects also invalidate a measurement of the square root error per se, since such measurements are based on the difference between the average of the square root of dynamic differential pressures and the square root of the average differential pressure. However, locations exist at which rectification cannot be avoided. For example, the change in cross section that occurs in the lead line entrance into a meter tube is unavoidable. It has been found that rounding off the junction at the inside diameter of the meter tube greatly reduces the rectification. However, only a slight rounding off of the junction at the inside diameter of the meter tube is allowed by regulation (A.G.A. 3—1985). Also, an unavoidable change in cross section occurs at the input to the transducer. Even if the transducer input is designed to match the diameter of the lead line, the acoustical path must terminate at the differential pressure sensing surface (diaphragm, solid state sensor or the like) of the transducer.

Any gas-filled constant diameter section of pipe is an excellent resonator. Such gas-filled pipe exerts only a small amount of damping on a standing wave. Thus, the pipe emulates an organ pipe and will resonate at a high amplitude at frequencies (harmonics) dependent upon the pipe length, types of end terminations, and the speed of sound. When these resonant frequencies coincide with the driving frequency or a multiple thereof, very high amplitudes will result. It is characteristic of most practical and/or available systems that compressor-generated frequencies (at some shaft speed) often coincide with the resonant frequencies of some length of compressor or meter station piping and with lengths within the primary or secondary elements of an orifice meter. In combination with flow-generated pulsations, this means that pulsation is present in most practical systems and that resonance at high amplitude is routine and prevalent.

When high amplitude resonance occurs in the secondary system, the resulting high dynamic pressures and particle velocities exaggerate such effects as rectification and energy redistribution. Hence, shifts in the average differential pressure are larger and create more serious errors. It should be noted that, in most installations, the upstream and downstream lead lines, valving and the like are nearly symmetrical so that these effects should be comparable in the upstream and downstream acoustic transmission lines. Such effects might, then, tend to balance. However, the driving frequencies and amplitudes at the upstream and downstream tap holes are not the same such that both the frequency spectrum and the amplitudes of resonances in the two would normally be quite different and such balancing would not occur.

From the preceding discussion, it is apparent that long lead lines in the secondary systems of orifice meters and other types of differential pressure meters often resonate at frequencies that coincide with compressor and flow-generated pulsations and, thus, give rise to severe pulsation-induced errors. Therefore, to avoid coincidence with driving frequencies, the lead lines must be as short as possible. However, measurement operations required a multiplicity of valves in the lead lines for isolation, zero-adjustment, calibration and similar related operations. The valves are discontinuities which create impedance mismatches that shift the average differential pressure and distort and amplify the dynamic component of differential pressure. There is a need, then, for a unique multi-valve manifold coupled with a unique flange/fitting insert for use in conjunction with an orifice meter as well as other differential pressure flow measuring devices for minimizing the pulsation-induced errors.

It is, therefore, a feature of the present invention to provide a unique apparatus and method for minimizing pulsation-induced errors for implementation with orifice meters and other differential pressure flow measuring devices. It is a more particular feature of the present invention to provide an apparatus and method for minimizing pulsation-induced errors to prevent any significant increase in the square root error associated with the secondary system of an orifice meter or similar differential pressure flow measuring device.

Another feature of the present invention is to provide an apparatus and method for minimizing pulsation-induced errors for use in conjunction with an orifice meter or other differential pressure flow measuring device and a transducer such that the secondary system maintains custody transfer accuracy under all practical ranges of operating and ambient conditions.

Yet another feature of the present invention is to provide an apparatus and method for minimizing pulsation-induced errors for use in conjunction with an installation including an orifice meter or other differential pressure flow measuring device in conjunction with a transducer such that using a low frequency transducer and a flow computation based on the square root of the average static differential pressure provides custody transfer accuracy under reasonable combinations of operating and ambient condition.

Yet still another feature of the present invention is to provide an apparatus and method for minimizing pulsation-induced errors for use in conjunction with an installation including an orifice meter or other differential pressure flow measuring device and a transducer to prevent the installation from going into resonance by eliminating any resonant lengths that coincide with or approximate frequencies present in the primary system.

A further feature of the present invention is to provide an apparatus and method for minimizing pulsation-induced errors for use at an installation including an orifice meter or another differential pressure flow measuring device and a transducer for reducing the effects of rectification and energy redistribution of the acoustical signal within the secondary system to minimize shifts in the average static differential pressure.

It is also a feature of the present invention to provide a unique insert apparatus which constitutes an extension of a unique multi-valve manifold such that, in conjunction or alone, a constant cross-section is maintained within and at all times egressing from an orifice flange or fitting and thereby enhancing the capabilities of the installation by (1) eliminating rectification in the secondary system to avoid shifts in average static differential pressure, (2) maintaining custody transfer accuracy under practical ranges of ambient and operating conditions, (3) avoiding the coincidence of pulsation frequencies in the primary system and resonant frequencies in the acoustic transmission component of the secondary system, (4) preventing high amplitude resonance in the acoustic transmission component of the secondary system and (5) minimizing the effects of energy redistribution on the average static differential pressure in the secondary system.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

In accordance with the present invention, a unique multi-valve manifold is provided for reducing the effects of resonance, rectification, energy redistribution, and the like. In a preferred embodiment of the invention, a multi-valve manifold is provided comprising (1) means for minimizing the distance between the primary element and the associated transducer in order to eliminate significant resonances that cause or exaggerate pulsation-induced errors, and eliminate long leadlines that cause or exaggerate errors because of energy redistribution, and (2) means for maintaining a constant cross section between the primary element and the associated transducer in order to eliminate pulsation-induced errors caused by rectification.

It is preferred that the multi-valve manifold comprise a manifold body having a first channel in operative connection upstream of the orifice meter and a second channel in operative connection downstream of the orifice meter, one or more valves in operative association with each of the channels for directing the pressure signals associated with each channel such that the path traversed by the pressure signal is minimized and a constant cross section is maintained therefor. The valves preferably have a valve positioning system comprising a dent plate in association with the one or more valves and a handle, arcuate channel and ball detent associated with each valve. The ball detent can be removeable associated with a plurality of recesses such that the exact function of the valve is readily determinable.

Preferably, each channel has associated therewith two ball valves or other full-opening valves. The latter two ball valves associated with each channel are themselves connected by a cross over passage. The cross over passage is connected with a vent passage to the atmosphere. The vent passage is associated with a plug valve which readily opens and closed the vent passage.

In a continuing embodiment of the present invention, a retrofit insert is provided for existing installations which provides a constant cross section from the orifice meter to the transducer while maintaining a minimal distance of traverse for the pressure signal.

It is preferable that the retrofittable insert comprise a first and second cannula in operative association with the upstream and downstream flow about the orifice meter. The cannula having a short constant cross section through which the transmitted pressure signal can pass from the orifice meter, through the manifold, and to the transducer.

In yet another embodiment of the present invention a method is provided for reducing pulsation-induced errors in differential flow measuring devices. The method of the present invention comprises adapting the orifice meter or the like for having apertures therein with constant cross sections corresponding to the channels of a manifold and respective cannular members, aligning the apertures and channels in registry for achieving a constant cross section therethrough, and engaging, operationally, the orifice meter, manifold and cannular members for providing a contiguous, close relationship with a constant cross section between the meter and a differential pressure detector.

BRIEF DESCRIPTION OF THE DRAWINGS

The accompanying drawings, which are incorporated into and constitute a part of the specification, illustrate preferred embodiments of the invention and, together with the general description of the invention given above, and the detailed description of the preferred embodiment given below serve to explain the principles of the invention.

The above general description and the following detailed description are merely illustrative of the generic invention, and additional modes, advantages and particulars of this invention will be readily suggested to those skilled in the art by the following detailed description.

DETAILED DESCRIPTION OF THE PREFERRED EMBODIMENTS

Reference will now be made in detail to a presently preferred embodiment of the invention as illustrated in the accompanying drawings where like numbers correspond to like parts. In the detailed description, an orifice meter is used as a descriptive example of a differential pressure flow measuring device used in conjunction with the apparatus and method of the present invention. Also, the terms flange and fitting(s) are used interchangeably and reference should be made to each figure. Components can be readily substituted by analogous components as would be readily apparent by one skilled in the art of differential pressure flow measuring devices.

Figure 1:
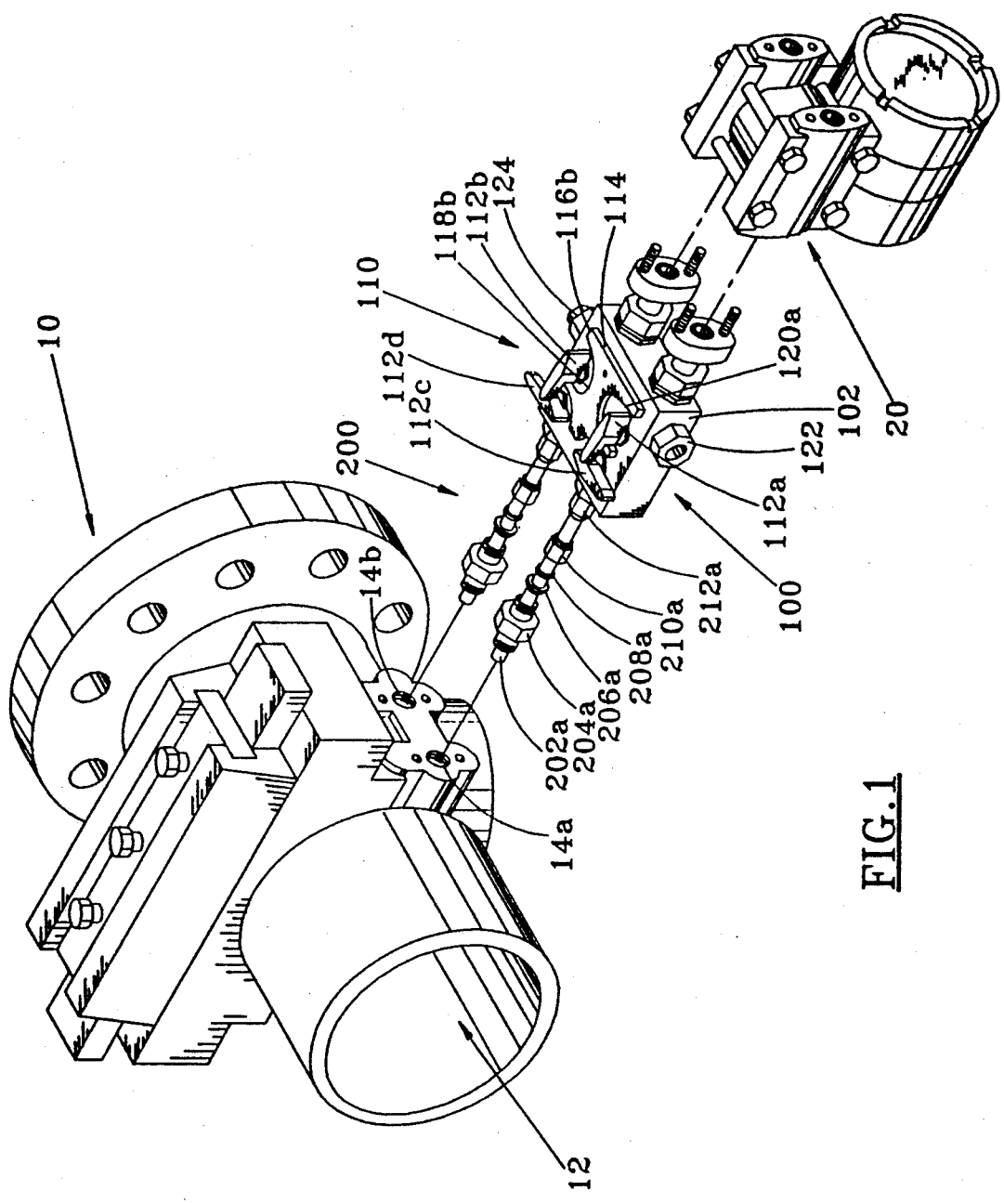
FIG. 1 is an exploded, isometric illustration of an orifice fitting, retrofittable insert, multi-valve manifold and pressure sensing transducer, the retrofittable insert and the multi-valve manifold are illustrations of the present invention.
Figure 2:
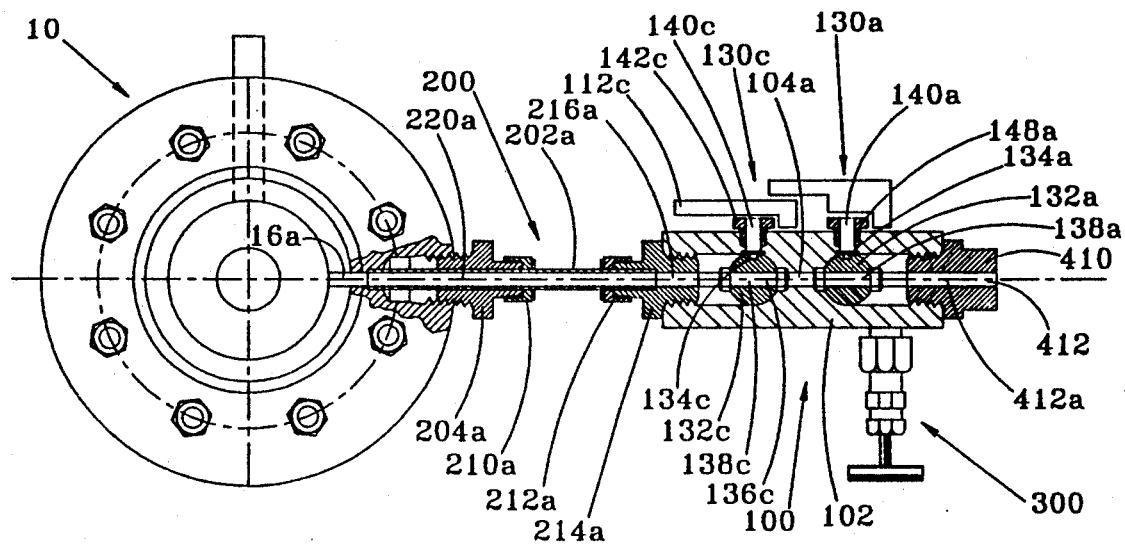
FIG. 2 is a cross-sectional view illustrating the multi-valve manifold and retrofittable insert of the present invention in connection with an orifice fitting.

FIG. 1 illustrates the insert 200 and the manifold 100 in conjunction with an orifice meter 10 and a pressure transducer 20. The insert 200 is illustrated comprising an upstream insert 200a and a downstream insert 200b. The inserts 200a, 200b are in all respects similar. For brevity, the insert 200a will be described in detail. The insert 200a comprises the cannula 202a having a channel 220a there through. The cannular 202a is adapted to be inserted into the tap hole 14a in the orifice fitting 10. The inside diameter of the channel 220a in the cannula 202a is congruent with the dimensions of the inside diameter of the tap hole 14a. A cross-sectional view of the congruency of the channel 220a and the tap hole 14a is illustrated in FIG. 2. The cannula 202a is removably secured by a tubing connector 204a. The tubing connector 204a is illustrated threadedly secured to the tap hole 14a. The cannula 202a is removeable secured to the tubing connector 204a using the compression nut 210a and the ferrules 206a, 208a. Similarly, the cannula is removably secured to the manifold 100 utilizing a compression nut 212a.

The insert 200 is configured to provide the shortest possible distance between the tap holes 14 and the manifold 100. Further, the cross section of the channel 220a of the cannula 202a provides a constant cross section for receiving the differential pressure from the flow passage 12 through the tap holes 14.

FIG. 1 illustrates the exterior of the manifold 100. The manifold 100 has a transducer port 122 and an optional transducer port 124 located on alternate sides of the manifold body 102. As illustrated in FIG. 1, the handles 112a, b, c, d are moveably associated with the top of the manifold body 102 for rotation in the plane parallel with the top. A positioning system 110 provides for the accurate location of the handles 112a, b, c, d when rotated parallel with the top of the manifold body 102. The positioning system 110 comprises the detent plate 114, the arcuate channels 116a, b, c, d, the recesses 118a, b, c and the ball detents 120a, b, c, d. As the handles 112 are turned, the ball detects 120 rotate in the arcuate channels 116. The ball detents 120 removably engage the recesses 118. The positioning system 110 is illustrated having three different positions. The handles 112a, b are illustrated in the "open" position. The handle 112c is illustrated in the "closed" position. The handle 112d is illustrated in the "bleeding" position. It should be appreciated with the number of positions and the purpose for each position of the positioning system 110 would differ with the differing uses of the manifold 100 of the present invention.

FIG. 2 is a cross-sectional view of FIG. 1 taken along a section associated with the downstream insert 200a and associated parts of the manifold 100. FIG. 2 illustrates the registry of the channel connecting the orifice fitting 10 with the transducer 20 (not illustrated in FIG. 2). Particularly, the channel 16a, the channel 220a, the channel 216a, the channel 104a and the channel 412a are all in registry. All of the channels 16a, 220a, 216a, 104a, 412a provide a constant cross section from the orifice meter 10 to the channel 412a which engages the transducer.

The insert 200a is illustrated fully engaged with the orifice fitting 10 and the manifold 100. The cannula 202a is inserted into the tap hole 14a to provide a constant cross section comprising the channel 16a within the tap hole 14a and the channel 220a within the cannula 202a. The cannula 202a is positioned in the tap hole 14a by the tubing connector 204a and removably secured to the tubing connector 204a by the compression nut 210a. Similarly, but at the alternate end, the cannula 202a is removably secured to the tubing connector 214a by the compression nut 212a. The tubing connector 214a has a channel 216a of equal cross section as the channel 16a and the channel 220a.

FIG. 2 provides a fragmentary view of the manifold 100. Of primary importance are the ball valves 130a, c. The ball valve 130c has associated there with the handle 112c. The handle 112c has connected thereto a stem/actuator tab 140c. The stem/actuator tab 140c engages the slot 134c for rotating the ball 132c. The ball 132c has there through, a main port 138c and a bleed port 136c.

Similarly, the ball valve 130a comprises the handle 112a in conjunction with the stem/actuator tab 140a. The stem/actuator tab 140a actively engages the ball 132a which is illustrated having a port 138a. The body 102 of the manifold 100 has therein a channel 104a which operatively connects the ball 132a with the ball 132c for providing a constant cross section there through. The tubing connector 410 is illustrated engaged with the rear portion of the body 102 of the manifold 100. The tubing connector 410 has there through a channel 412. Similarly, the channel 412 is in registry with the port 138a, the channel 104a, the main port 138c, the channel 116a, the channel 220a in the cannula 202a, and the channel 16a in the orifice fitting 10.

Figure 3:
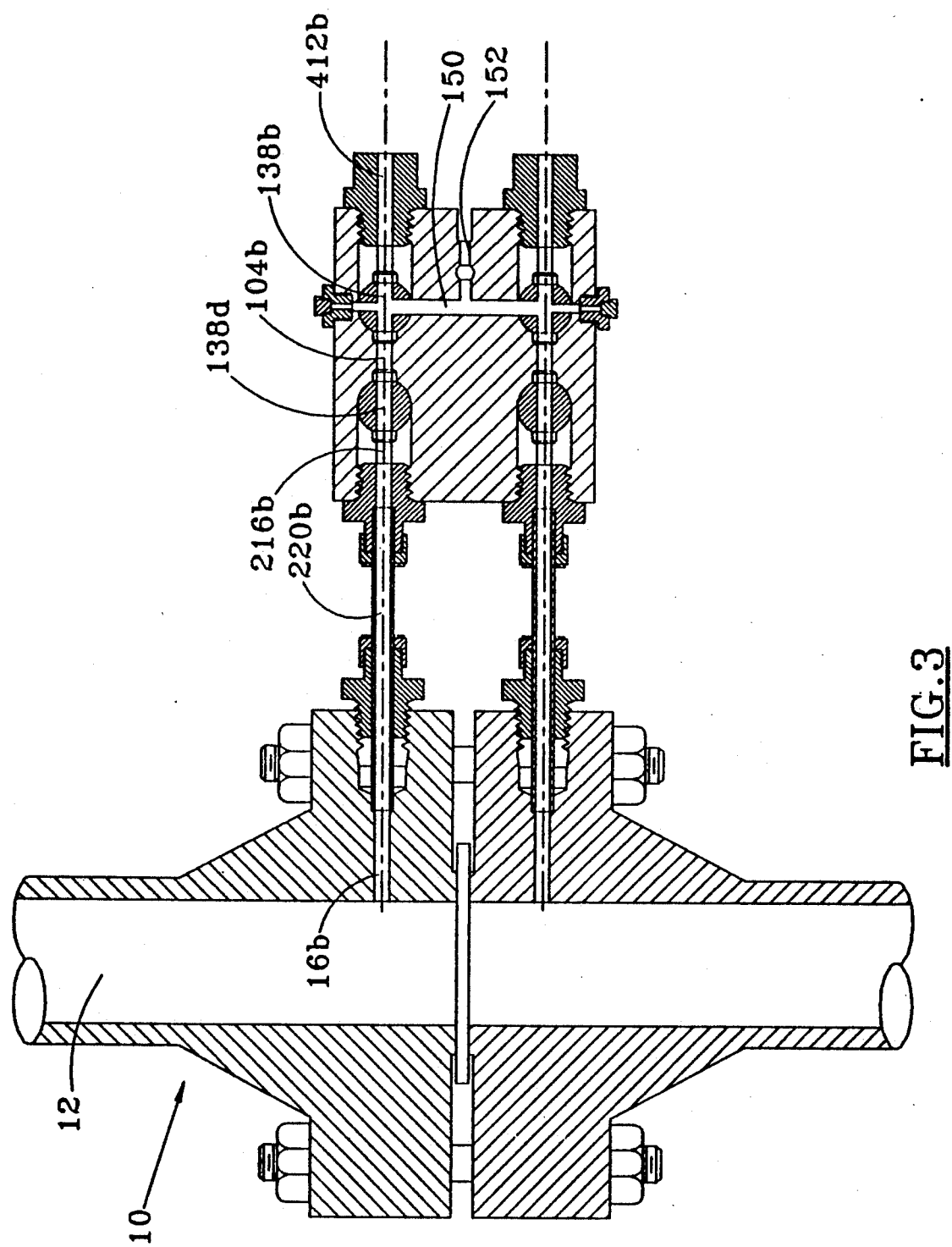
FIG. 3 is a plan view of the multi-valve manifold and retrofittable insert of the present invention taken along the section line 3—3 in FIG. 2 shown in association with an orifice fitting.

FIG. 3 illustrates the parallel registry of the channels 16, 220, 216, 104 and 412. Also, FIG. 3 illustrates that the ball valves 130a, b are three-way valves. The ball valves 130c, d are bleeder ball valves. As previously discussed with reference to FIG. 1, each of the valves 130 can be accurately positioned using the positioning system 110. The accurate positions relate to the positions illustrated in FIG. 3. For example, with respect to three-way valves, the ball valves 130a, b can be readily positioned to provide opened, intermediate and closed positions. Similarly, the ball valves 130c, d can be positioned in an open position, a bleeding position and a closed position.

FIG. 3 also illustrates the cross over passage 150. The cross over passage 150 provides that the ball valves 130a, b can be pressurized in unison for calibrating the associated transducer 20. Also, the vent passage 152 is illustrated for venting the pressure within the manifold 100 to ambient pressure.

Figure 4:
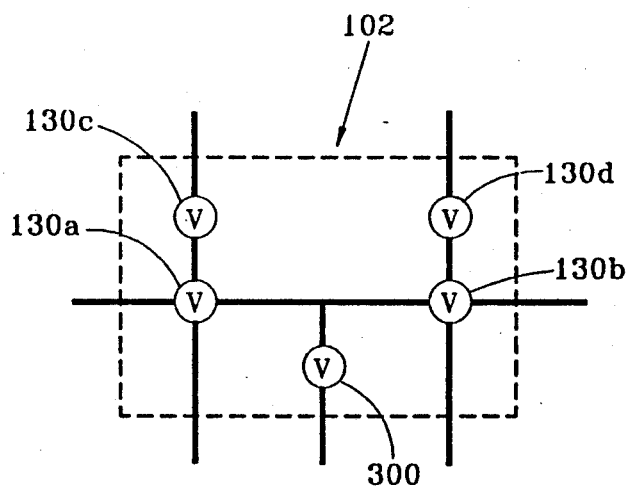
FIG. 4 is a schematic illustration of the multi-valve manifold of the present invention showing the relationship of the pressure signal passages, cross over passage and vent passage in association with the respective valves.

FIG. 4 illustrates a schematic representation of the manifold 100. The dashed lines represent the manifold body 102. Illustrated are the bleeder plug valve 300, the bleeder ball valve 130c, the three-way ball valve 130a, the three-way ball valve 130b, and the bleeder ball valve 130d.

Figure 5:
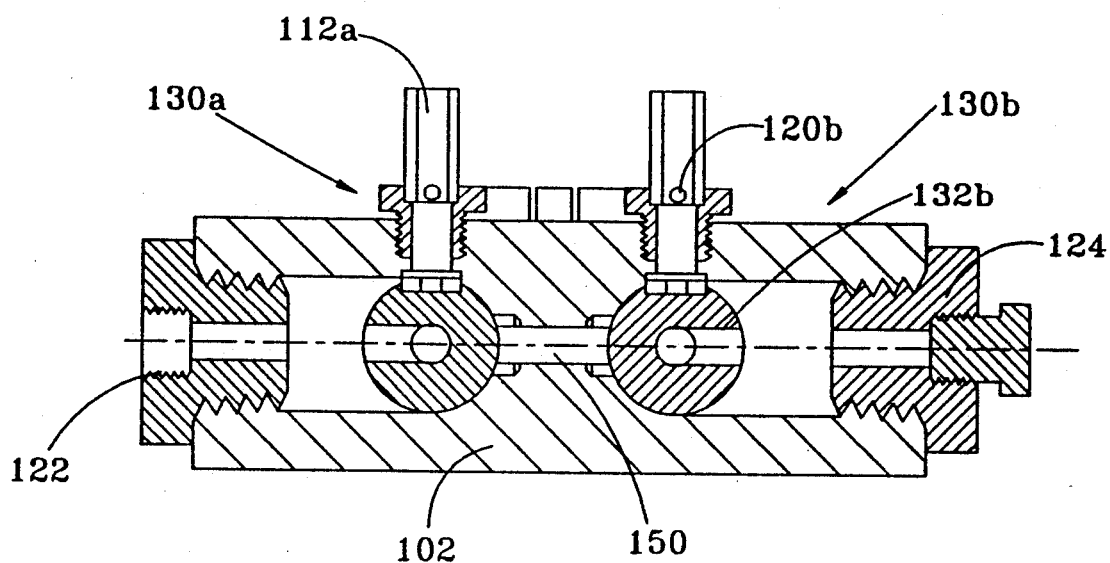
FIG. 5 is a cross-sectional view taken along the section line 5—5 in FIG. 2 illustrating the three-way ball valves in association with the cross over passage.

FIG. 5 illustrates a cross-sectional of the ball valves 130a, b view taken along the section line 5—5 in FIG. 2. FIG. 5 illustrates the positional relationship of the ball valves 130a, b. The ball valves 130a, b are illustrated in the open position. It is apparent that the balls 132a, b provide for three-way pressurization. Also illustrated is the cross over passage 150.

Figure 6:
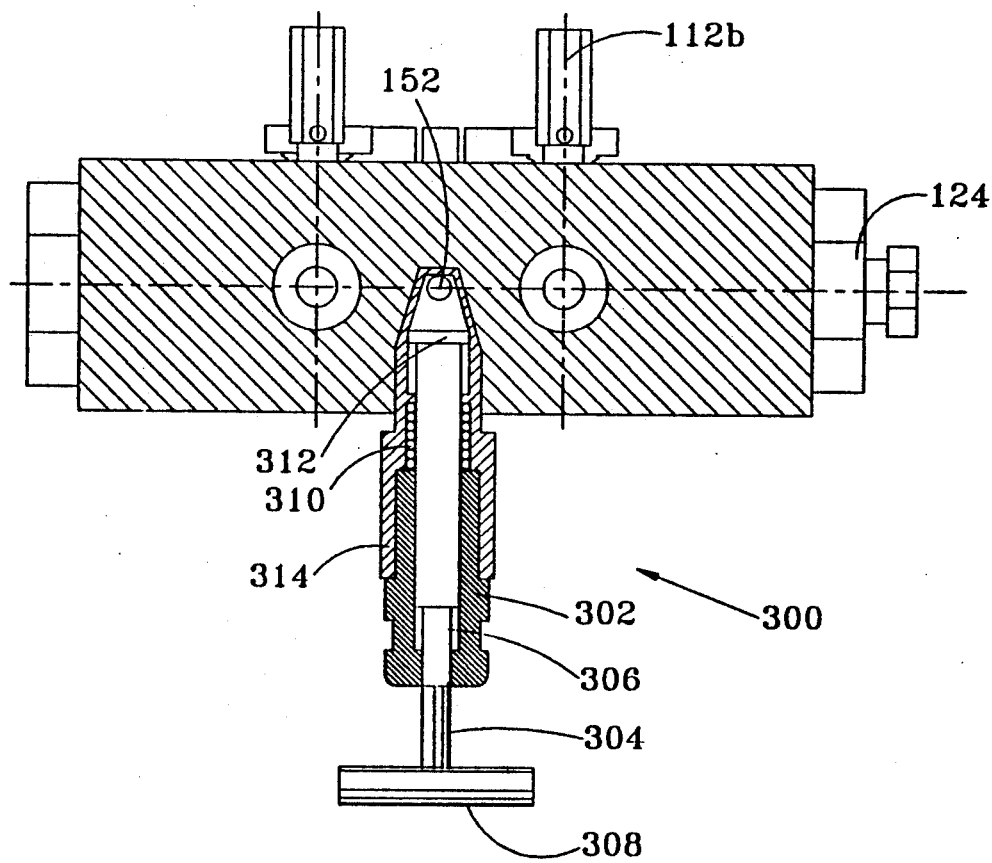
FIG. 6 is a cross-sectional view taken along section lines 6—6 in FIG. 2 illustrating the plug valve.

FIG. 6 is a cross-sectional view taken along section line 6—6 of FIG. 2 illustrating the plug valve 300. The plug valve 300 comprises the handle 108 and the shaft 304. The shaft 304 has associated there with the drive threads 306. The drive threads 306 rotatably engage the stuffing box nut 302. The stuffing box nut 302 engages the collar 314. The collar 314 is affixed in the body 102. A packing member 310 operates to maintain the pressurization of the plug valve 300. When the handle 308 is turned, the sealing member 312 opens and closes the vent passage 152.

Figure 7:
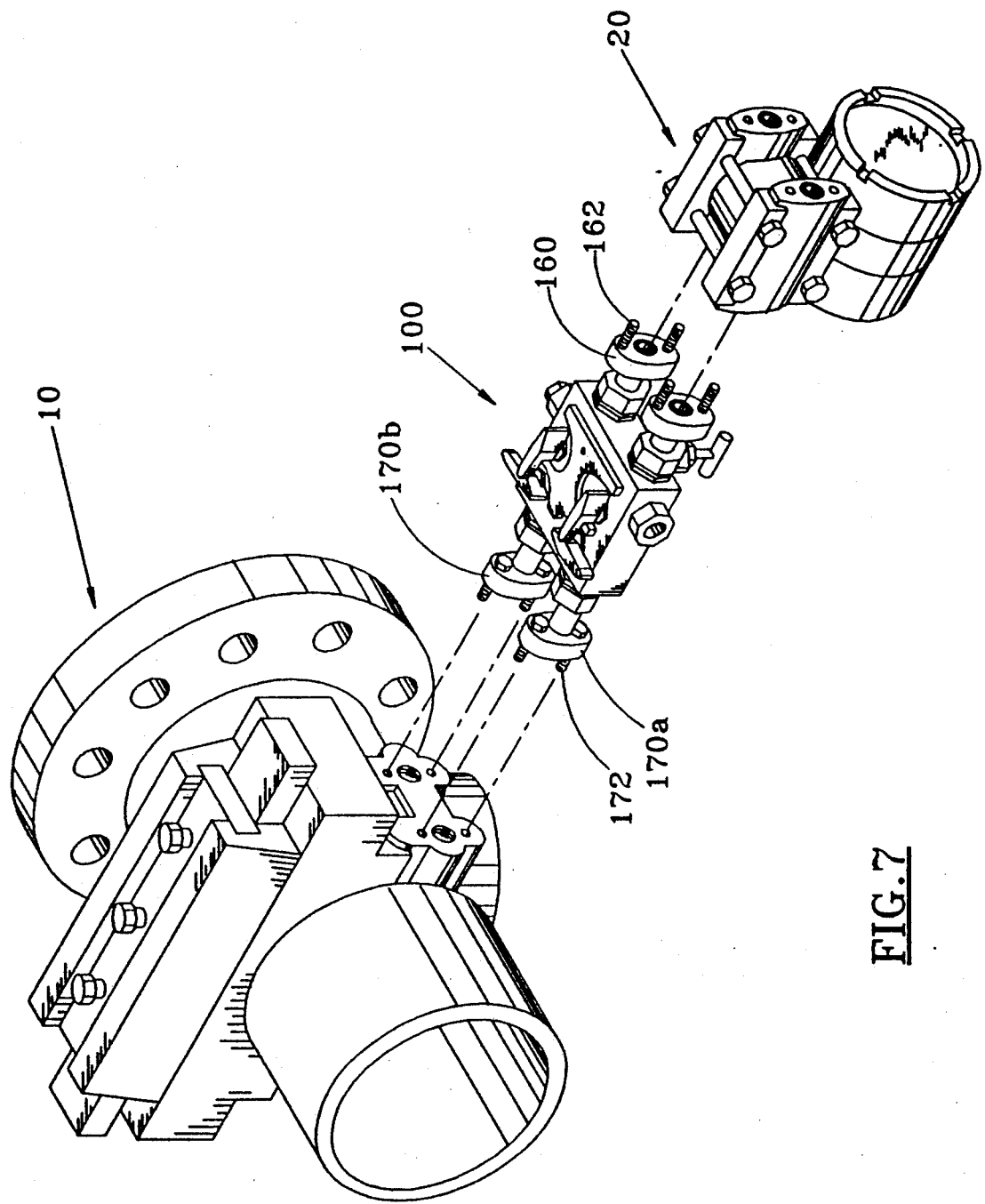
FIG. 7 is an exploded illustration of the multi-valve manifold of the present invention depicting its use exclusive of the insert.

FIG. 7 is an exploded view of the manifold 100 of the present invention as optimally used. When the manifold 100 is used without the insert 200, the registry of channels is maintained. As readily apparent, the distance between the orifice fitting 10 and the transducer 20 is maintained as short as possible with the embodiment of the manifold 100 illustrated in FIG. 7. The close connectors 170a, b are removably secured to the orifice meter 10 by the bolts 72. Thus, the close connectors 170a, b provide that the multi-valve manifold 100 is maintained in close proximity to the orifice meter 10. Similarly, the close connectors 160a, b are removably affixed to the pressure transducer 20 using the bolts 162. In the embodiment of the present invention illustrated in FIG. 7 provides that the pressure transducer 20 can be operatively associated with the orifice meter 10 such that the distance between the orifice meter 10 and the pressure transducer 20 is minimal. As previously discussed, the cross sectional area of the channels in registry from the orifice meter 10 to the pressure transducer 20 is maintained constant.

Figure 8:
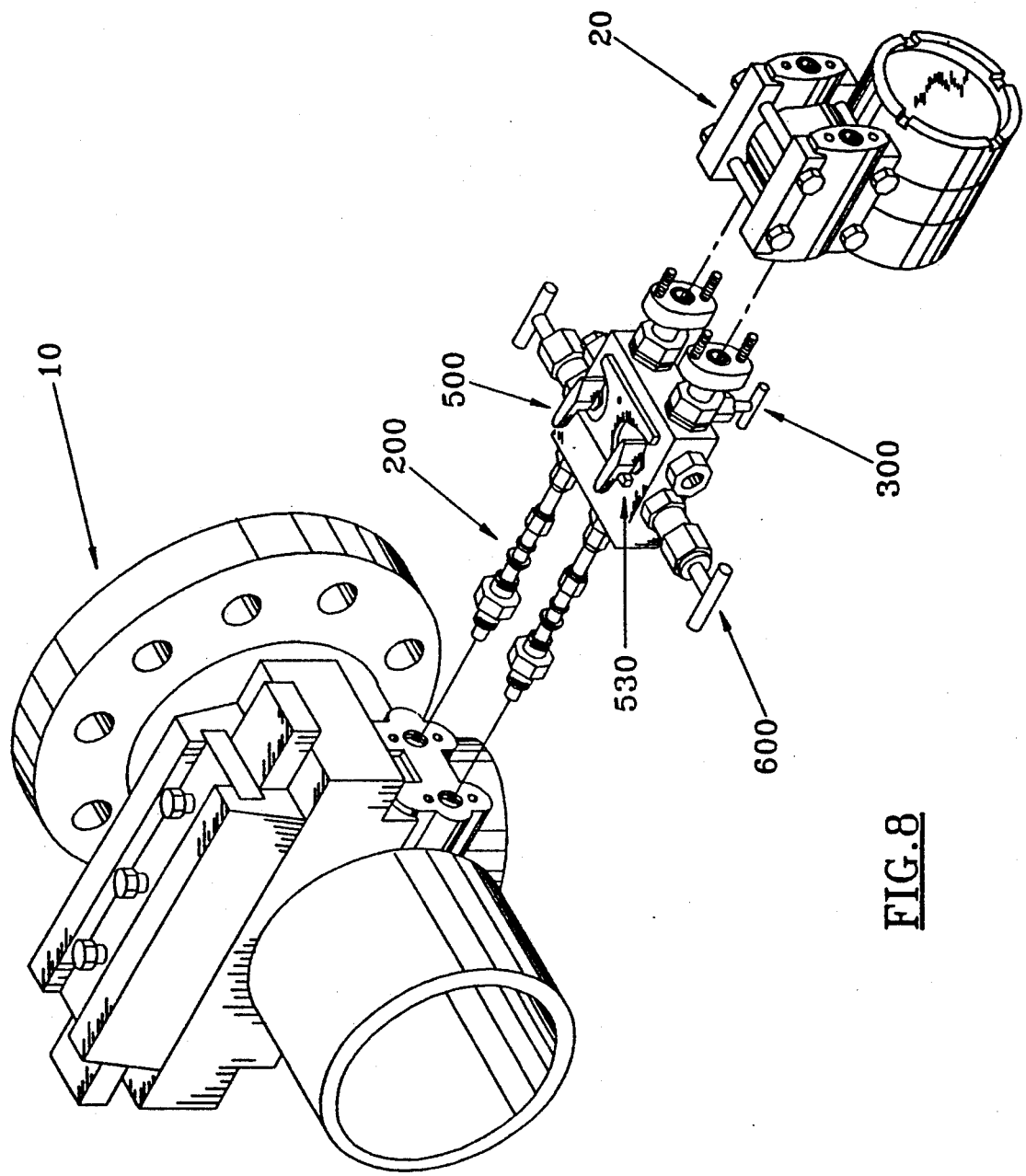
FIG. 8 is an exploded illustration of an alternate embodiment of the multi-valve manifold and the retrofittable insert of the present invention in association with an orifice fitting and a transducer.

FIG. 8 is an illustration of an alternate embodiment of the multi-valve manifold 500 of the present invention. Also illustrated in FIG. 8 is the insert 200 of the present invention. The insert 200 is threadedly affixed to the orifice flange 10 and the multi-valve manifold 500. The multi-valve manifold 500 is removably affixed to the pressure transducer 20. As illustrated, the ball valves 530c, d illustrated in FIGS. 1 through 7 are replaced with the plug valves 600a, b illustrated in FIGS. 8 through 12.

Figure 9:
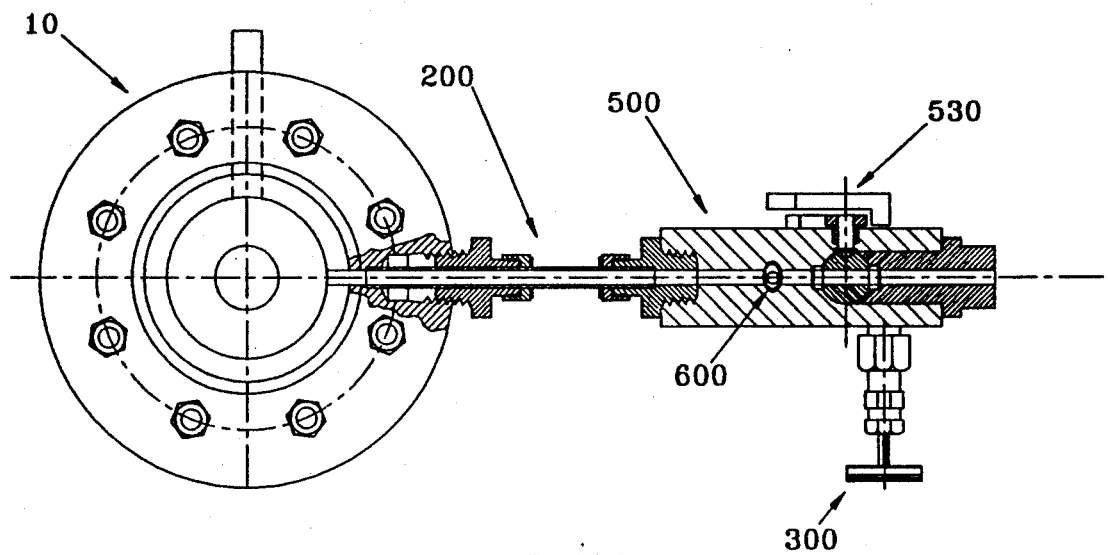
FIG. 9 is a cross-sectional view illustrating an alternate embodiment of the multi-valve manifold and retrofittable insert of the present invention in connection with an orifice fitting.

FIG. 9 is a cross-section of FIG. 8 taken along the axis passing through the registry of the channels associated with the plug valves 600b and the ball valve 530b.

Figure 10:
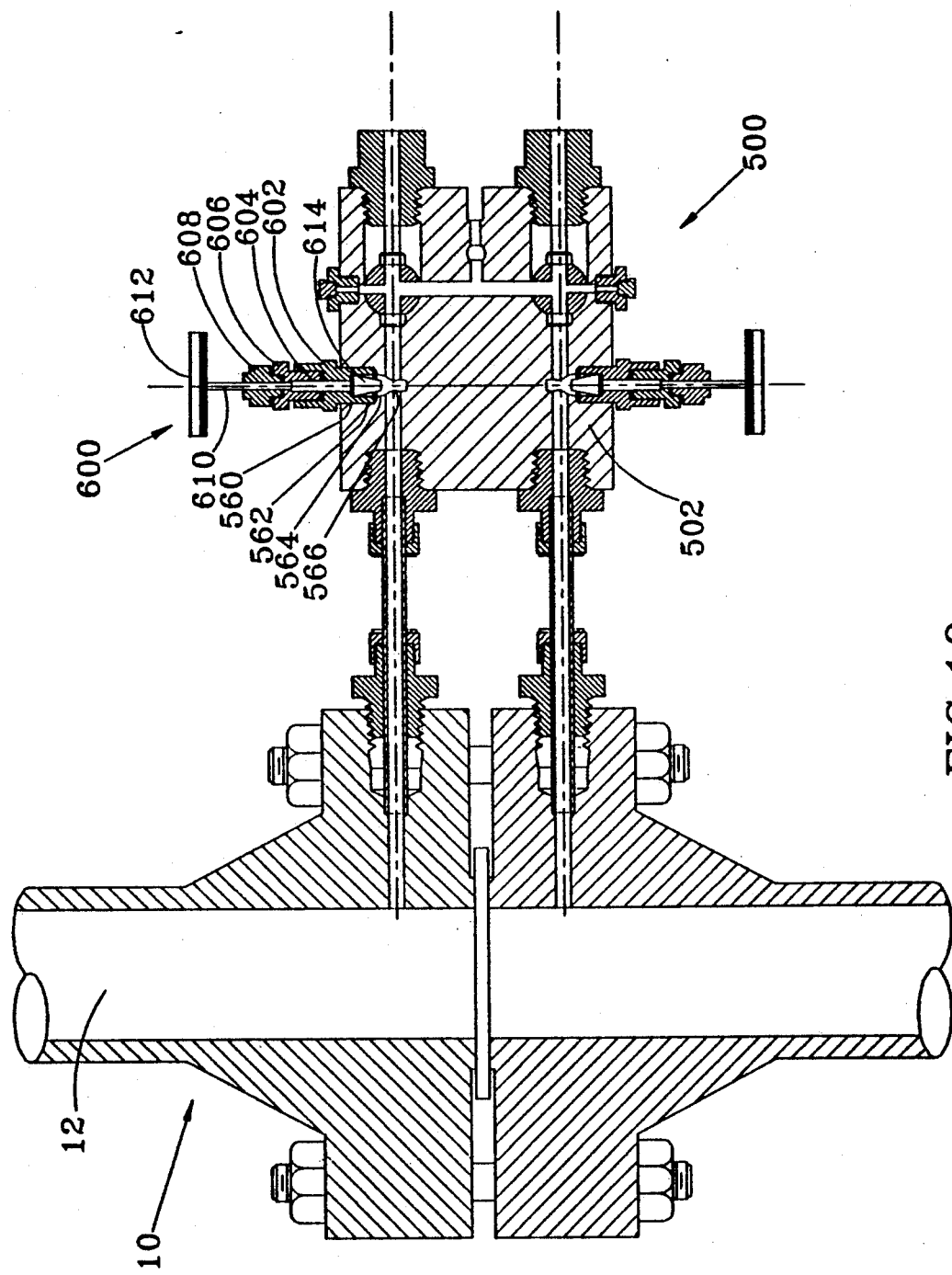
FIG. 10 is a plan view of an alternate embodiment of the multi-valve manifold and retrofittable insert of the present invention taken along the section line 3—3 in FIG. 2 shown in association with an orifice fitting.

FIG. 10 is a plan, cross-sectional view of FIG. 9 taken along the plane through the mid-section of the two channels in registry. Since the plug valves 600a, b are of like construction, only a generic plug valve 600 will be described in detail. The plug valve 600 comprises the elements of the stuffing box 602, the packing 604, the packing retainer 606, the stem guide 608, the stem 610, the handle 612 and the plug 614. The stuffing box 602 is threadedly engaged with the receptacle 560 in the manifold body 502. The receptacle 560 has a threaded cylindrical portion 562 for accepting the stuffing box 602. Also, the receptacle 560 has a frustum-shaped 564. The frustum-shaped portion 564 has a concaved annular section 566. The stuffing box 602 is threadedly engaged with the manifold body 502 down to the frustum-shaped portion 564 of the receptacle 560. The stem 610 has at one end a plug 614 and at the other end a handle 612. The stem 610 is moveably engaged with the stuffing box 602 such that the plug 614 can be engaged in the frustum-shaped portion 564 of the receptacle 560. The stem 610 is securely engaged within the stuffing box 602 using the packing 604. The packing 604 is maintained by the packing retainer 606. The packing retainer 606 is removably secured by the stem guide 608. As the handle 612 is rotated, the stem 610 is journaled into the stuffing box 602 for driving the plug 614 into the frustum-shaped portion 564 of the receptacle 560. The plug 614 provides a secure fit due to the concaved annular section 566.

Figure 11:
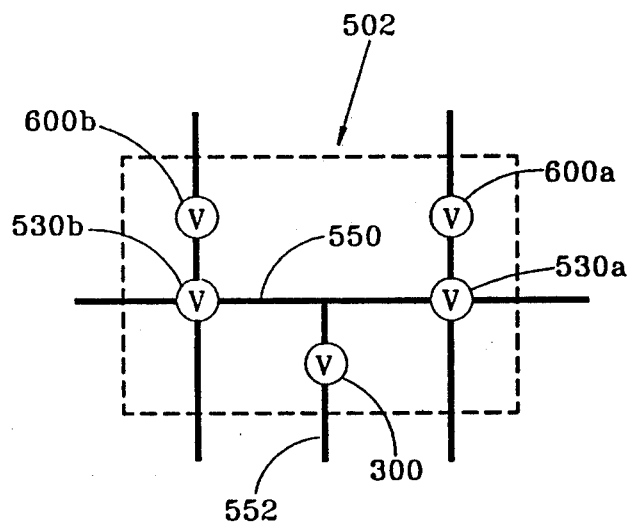
FIG. 11 is a schematic illustrating of an alternate embodiment of the multi-valve manifold of the present invention showing the relationship of the pressure signal passages, cross over passage and vent passage in association with the respective valves.

FIG. 11 is a schematic illustration of the alternate embodiment of the multi-valve manifold of the present invention. FIG. 11 illustrates the relationship of the plug valves 600a, b, the ball valves 530a, b and the plug valve 300. Also, FIG. 11 illustrates the relationship of the pressure signal passages, the cross over passage 550 and the vent passage 552.

Figure 12:
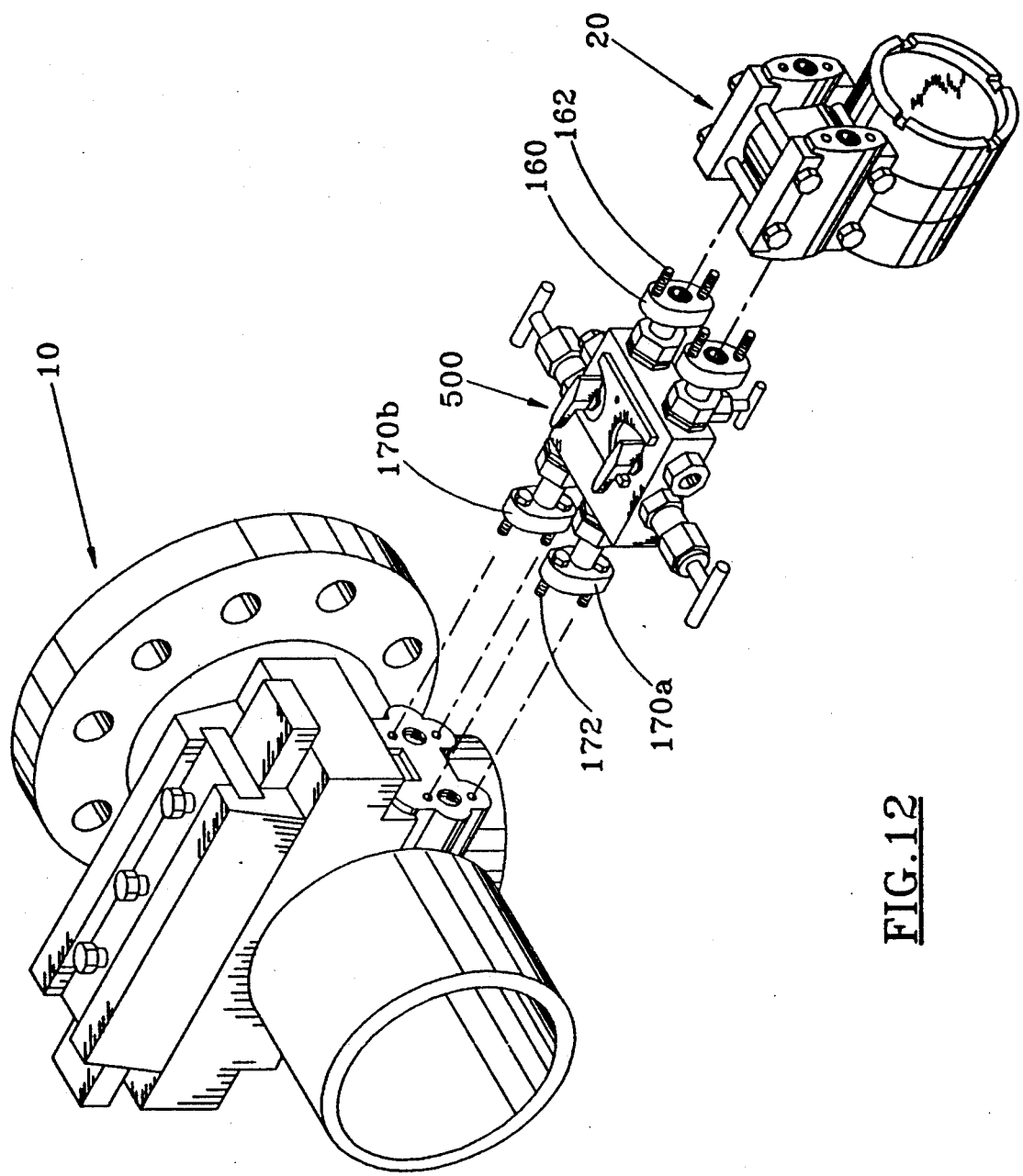
FIG. 12 is an exploded illustration of an alternate embodiment of the multi-valve manifold of the present invention depicting its use in new fittings exclusive of the insert.

FIG. 12 is an exploded illustration of another embodiment of the multi-valve manifold 500 of the present invention exclusive of the insert 200. The multi-valve manifold 500 utilizes the plug valves 600a, b in conjunction with the ball valves 530a, b. The multi-valve manifold 500 is closely affixed to the orifice meter 10 using the close connectors 70a, b and the bolts 172. Similarly, the multi-valve manifold 500 is closely positioned with respect to the pressure transducer 20 utilizing the close connectors 160a, b and the bolts 162. The multi-valve manifold 500 illustrated in FIG. 12 provides that the orifice flange 10 is in extremely close proximity to the pressure transducer 20.

Existing differential flow measuring devices can be retrofitted to incorporate the astute concepts of the present invention. A method of retrofitting is presented which provides for the modification of existing differential flow measuring devices for practicing the present invention. Prior to modifying existing differential flow measuring devices, preparatory procedures should be initiated.

For example, the preparatory procedure for modifying orifice flanges and fittings is to remove the flange or fitting from its pipeline and relocate the flange or fitting to a safe environment to perform the necessary machining. The machining adapts the flange or fitting for accepting the insert 200 of the present invention. Alternatively, if the flange or fitting cannot be removed or is welded in place, the flange or fitting should be "detached" by isolation using valves upstream and downstream, appropriately purged to remove any hazardous gases from the area of concern permits the modifications to be safely performed. The proper safety equipment required for such environments should be used, e.g., air powered tools, gas detectors and similar equipment.

The machining for implementing the method of the present invention and for engaging the insert should be performed to ensure the concentricity with the tap hole being retrofitted. Fabrication of a fixture by those skilled in the art for use in association with fittings includes the following steps: (1) The fixture can be fastened to the fitting through an existing threaded hole or an additional fixture can be fabricated using the tap holes for alignment to add the necessary threaded holes. (2) The fixture can use one of the tap holes for alignment while boring the opposite tap hole for accepting the insert. The concentric location of the tap holes will permit reversal of the fixture for modification of the previously aligned tap hole.

Further to exemplify the present method, the modification of orifice flanges requires a different fixture. The method of the present invention for adapting a fixture for use with flanges include the following: (1) fastening the fixture to the flanges in a manner, such as for example, using the adjacent studs on the flange face, (2) using one of the tap holes for aligning the fixture while boring the opposite tap hole for accepting the insert. The concentric location of the tap holes will permit reversal of the fixture for modification of the previously aligned tap hole. Having made such modifications and initiated such steps the invention can now be installed as shown in the present figures.

OPERATION

Figure 13A:
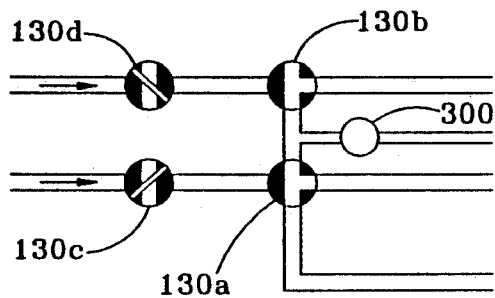
FIGS. 13A-13E are schematic illustrations of the operation of the multi-valve manifold of the present invention.
Figure 13B:
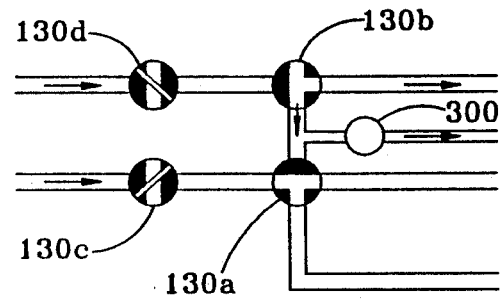
Figure 13C:
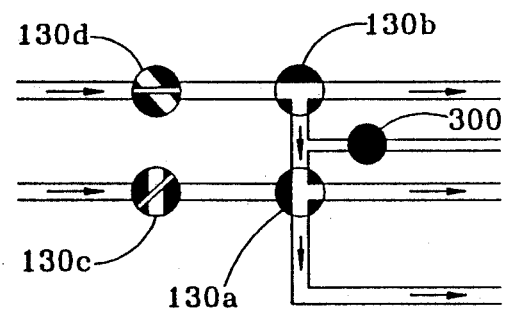
Figure 13D:
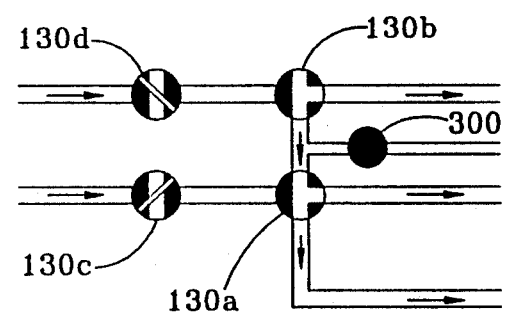
Figure 13E:
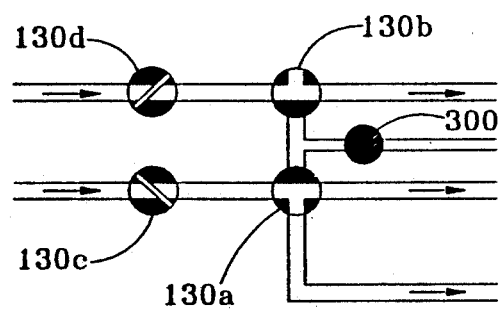

The operational function required of any multi-valve manifold is to allow a very sensitive differential pressure transducer (that must measure pressure differentials on the order of 3.5 psi in the presence of static line pressure in the hundred [100s] psi range) to be put into and out of service for operation, testing, calibration and repair without damaging the device, i.e., without subjecting the sensitive element to full line pressure differential. The valving combinations shown in FIGS. 13A through 13E allow a controlled pressurization and depressurization of the transducer while maintaining a minimum pressure imbalance across the differential pressure sensing element. FIG. 13A shows valve positions used to blow down (depressurize) the manifold. FIG. 13B shows those used for calibration of the differential pressure transducer against a standard. FIG. 13C shows those used to pressurize the manifold. FIG. 13D shows those required to adjust the zero differential pressure position of the transducer. FIG. 13E shows those used for normal in-service operations.

FIG. 13 illustrates the valve positions in the multi-valve manifold 100 in accomplishing these operations for the present invention. Specifically, FIG. 13A illustrates the balancing of the differential pressure transducers. The line pressure is disengaged by valves 13c and 13d during the balancing mode. When the plug valve 300 is open to ambient pressure, the system is vented to ambient pressure. The differential pressure transducers can then be calibrated against a differential pressure standard.

FIG. 13B illustrates the calibration mode of the multi-valve manifold 100 of the present invention. The bleeder valves 130c, d are closed. The three-way valve 130b is open so that the differential pressure standard can be connected with the operating differential pressure transducer.

FIG. 13C illustrates the pressurizing mode of the multi-valve manifold 100 of the present invention. The upstream three-way valve 130b is in the fully open position, the plug valve 300 is closed to ambient pressure, the downstream bleeder valve 130c is closed, and the downstream three-way valve 130a is fully open between all transducers. To pressurize the system, the upstream bleeder valve 130d is open to the bleed position.

FIG. 13D illustrates the balancing mode of the multi-valve manifold 100 of the present invention with the line pressure engaged. The upstream and downstream bleeders valves 130c, d are closed, the upstream and downstream three-way valves 130a, b are in the open position to fully engage all transducers, the plug valve 300 is closed to atmospheric pressure. Under this configuration, the "zero" differential pressure indication on the differential pressure transducer can be checked.

FIG. 13E illustrates the multi-valve manifold 100 of the present invention in the normal operating mode. The upstream and downstream bleeder valves 130c, d are fully open. The upstream and downstream three-way valves 130a, b are in registry with the bleeder valves 130c, d and the plug valve 300 is closed.

What is claimed is:

1. Apparatus for connecting an orifice meter or the like to a differential pressure detector, the orifice meter integral with a pressure signal includes one or more pressure transmitting ports, the apparatus comprising:

(a) a first connecting means for joining the apparatus to the orifice meter by way of the pressure transmitting port for receiving the pressure signal from the orifice meter, said first connecting means having a constant cross section from the orifice meter, through the pressure transmitting port, and through the first connecting means, (b) a housing comprising
  (1) one or more inlet ports in operative association with said first connecting means for receiving the pressure signal from the orifice meter, said inlet ports having a constant cross section equal to the cross section of said first connecting means,
  (2) valve means associated with said inlet port for controlling the pressure signal from the orifice meter, said valve means having a passage of constant cross section equal to the cross section of said inlet port, and
  (3) one or more outlet ports in operative association with said valve means for receiving the pressure signal from the orifice meter, said outlet ports having a constant cross section equal to the cross section of said valve means, and (c) a second connecting means for joining said housing directly to the differential pressure detector employing said outlet port for receiving the pressure signal from the orifice meter, said second connecting means having a constant cross section equal to the cross section through said housing, said first connecting means, said housing, and said second connecting means configured for providing a contiguous, abutting relationship between the orifice meter and the differential pressure detector.

2. An apparatus as defined in claim 1, wherein said valve means comprises one or more upstream valves in operative association with and upstream of the orifice meter, and one or more downstream valves in operative association with and downstream of the orifice meter.

3. An apparatus as defined in claim 2, wherein said upstream valve and said downstream valve comprise one or more ball valves with each ball valve having at least one passage of constant cross section for directing the differential pressure therethrough.

4. An apparatus as defined in claim 2, wherein each of said upstream valve and said downstream valve comprise a first ball valve and a second ball valve with each ball valve having at least one passage of constant cross section for directing the differential pressure therethrough, and said first ball valve comprises a bleeder passage for stabilizing rates of change of pressure sufficient for maintaining, calibrating and testing the differential pressure detector.

5. An apparatus as defined in claim 2, wherein said upstream valve comprises a ball valve and a plug valve in series relationship with each valve having at least one passage of constant cross section for directing the differential pressure therethrough.

6. An apparatus as defined in claim 2, wherein said downstream valve comprises a ball valve and a plug valve in series relationship with each valve having at least one passage of constant cross section for directing the differential pressure therethrough.

7. Apparatus for connecting an orifice meter or the like to a differential pressure detector, the orifice meter integral with a pressure signal includes one or more pressure transmitting ports, the apparatus comprising:

(a) a first connecting means for joining the apparatus to the orifice meter by way of the pressure transmitting port for receiving the pressure signal from the orifice meter, said first connecting means having a constant cross section from the orifice meter, through the pressure transmitting port, and through the first connecting means, (b) a housing comprising
  (1) one or more inlet ports in operative association with said first connecting means for receiving the pressure signal from the orifice meter, said inlet ports having a constant cross section equal to the cross section of said first connecting means,
  (2) valve means associated with said inlet port for controlling the pressure signal from the orifice meter, said valve means having a passage of constant cross section equal to the cross section of said inlet port and said valve means comprises one or more upstream valves in operative association with and upstream of the orifice meter, and one or more downstream valves in operative association with and downstream of the orifice meter, wherein said upstream valve and said downstream valve comprise one or more ball valves with each ball valve having at least one passage of constant cross section for directing the differential pressure therethrough, wherein at least one ball valve comprises a bleeder passage for stabilizing rates of change of pressure sufficient for maintaining, calibrating and testing the differential pressure detector, and
  (3) one or more outlet ports in operative association with said valve means for receiving the pressure signal from the orifice meter, said outlet ports having a constant cross section equal to the cross section of said valve means, and (c) a second connecting means for joining said housing directly to the differential pressure detector employing said outlet port for receiving the pressure signal from the orifice meter, said second connecting means having a constant cross section equal to the cross section through said housing, said first connecting means, said housing, and said second connecting means configured for providing a contiguous, abutting relationship between the orifice meter and the differential pressure detector.

* * * * *